United States Patent
Lovett et al.

(10) Patent No.: US 7,295,898 B2
(45) Date of Patent: Nov. 13, 2007

(54) INSECT CONTROL APPARATUS AND METHOD

(75) Inventors: Rod Lovett, Katy, TX (US); Jim Jackson, Houston, TX (US); Glenn Standley, Houston, TX (US); William Maslin, Houston, TX (US)

(73) Assignee: Mist Away Systems, Inc., Houston, TX (US)

( * ) Notice: Subject to any disclaimer, the term of this patent is extended or adjusted under 35 U.S.C. 154(b) by 138 days.

(21) Appl. No.: 11/338,398

(22) Filed: Jan. 24, 2006

(65) Prior Publication Data

US 2007/0173980 A1 Jul. 26, 2007

(51) Int. Cl.
*G05D 11/00* (2006.01)

(52) U.S. Cl. .................................................... 700/283

(58) Field of Classification Search ........ 700/282–285; 239/68.69, 93, 144
See application file for complete search history.

(56) References Cited

U.S. PATENT DOCUMENTS

| | | | | |
|---|---|---|---|---|
| 3,676,949 A | * | 7/1972 | Ramsey ....................... 43/124 |
| 3,793,762 A | * | 2/1974 | Stains ......................... 43/124 |
| 3,889,881 A | * | 6/1975 | Cunningham et al. ........ 239/70 |
| 3,926,369 A | * | 12/1975 | Pearce ........................... 239/1 |
| 3,979,063 A | * | 9/1976 | Query .......................... 239/70 |
| 4,050,629 A | * | 9/1977 | Query et al. .................. 239/11 |
| 5,303,866 A | * | 4/1994 | Hawks, Jr. .................. 239/142 |
| 5,333,785 A | * | 8/1994 | Dodds et al. ................. 239/69 |
| 5,876,665 A | * | 3/1999 | Zalis ............................ 422/28 |
| 6,003,787 A | * | 12/1999 | Fisher ......................... 239/373 |
| 6,047,495 A | * | 4/2000 | Matsumura et al. .......... 43/124 |
| 6,199,770 B1 | * | 3/2001 | King et al. .................. 239/208 |
| 6,302,161 B1 | * | 10/2001 | Heller et al. ................... 141/9 |
| 6,452,499 B1 | * | 9/2002 | Runge et al. ............... 340/601 |
| 6,669,105 B2 | * | 12/2003 | Bryan et al. .................. 239/61 |
| 6,823,239 B2 | * | 11/2004 | Sieminski .................... 700/284 |
| 6,897,374 B2 | * | 5/2005 | Garber et al. ................. 174/47 |
| 7,009,519 B2 | * | 3/2006 | Leonard et al. .......... 340/572.8 |
| 7,066,218 B1 | * | 6/2006 | Fleming et al. ............. 141/198 |
| 2004/0035949 A1 | * | 2/2004 | Elkins et al. ................. 239/70 |
| 2004/0162850 A1 | * | 8/2004 | Sanville et al. ......... 707/103 Y |
| 2006/0000854 A1 | * | 1/2006 | Hornsby et al. .......... 222/464.5 |
| 2006/0086823 A1 | * | 4/2006 | Colarusso et al. .......... 239/337 |
| 2006/0261188 A1 | * | 11/2006 | Ito et al. ..................... 239/306 |

* cited by examiner

*Primary Examiner*—Leo Picard
*Assistant Examiner*—Chad Rapp
(74) *Attorney, Agent, or Firm*—Timothy F. Mills

(57) ABSTRACT

A method and apparatus for insect control by delivery of fluids combined from different sources is disclosed, wherein a first fluid is provided in a cartridge configured with a first fluid coupling and a first wireless transmitter (FWT), and a second fluid, or diluent, is supplied to form a mixture for distribution or spraying. The FWT is programmable with data identifying the composition and volume of the liquid in the cartridge and able to contain data of withdrawal of fluid or pump cycles. An interrogator or second wireless transmitter (SWT) communicates with the FTW to control the fluid withdrawal and mixing process. In addition, the combination of the cartridge identification and the coupling design restrict introduction of improper materials into the system, and potentially to an inhabited area.

27 Claims, 3 Drawing Sheets

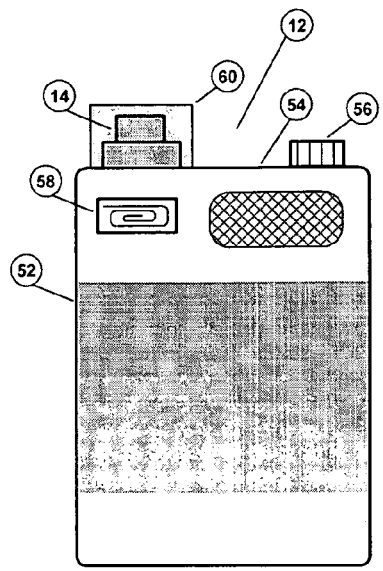
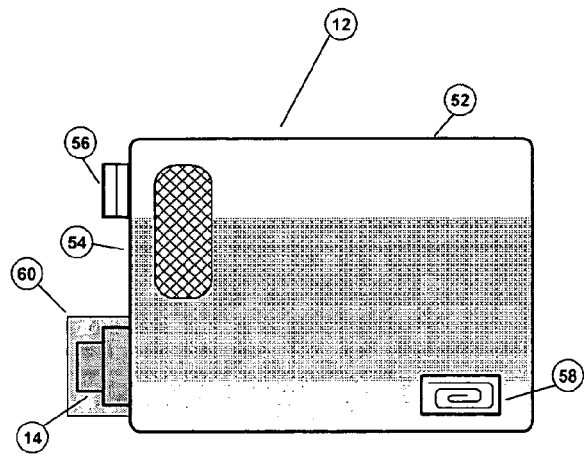
Fig 2A
Fig 2B
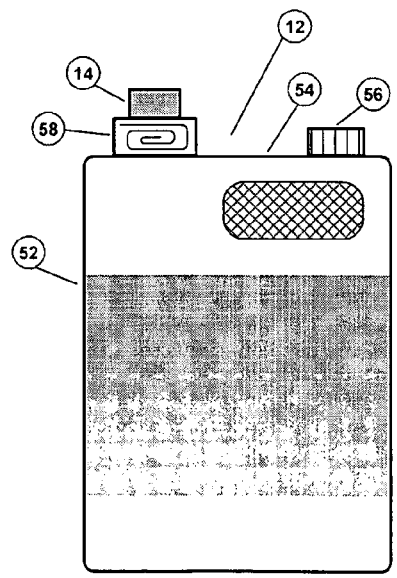
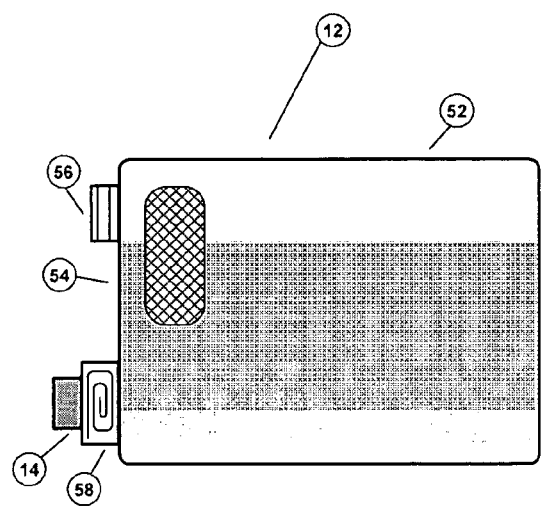
Fig 3A
Fig 3B

INSECT CONTROL APPARATUS AND METHOD

BACKGROUND OF THE INVENTION

The present invention relates generally to the field of devices, and methods derived therefrom, used to deliver a fluid from a reservoir to a distribution apparatus. More particularly to such a device that is capable of programmable delivery of a predetermined fluid volume directly from an off-the-shelf container, with the fluid volume containing a predetermined concentration in solution, suspension, or mixture. More particularly, the programmable concentration function aided by use of RFID (radio frequency identification) tag data control for delivery of an insecticide, pesticide, or repellent to an area or volume.

In a household or commercial installation of the spray or liquid delivery system, the consumer or technician can remove an empty cartridge of the present invention that had been purchased off-the-shelf by disengaging the integral snap-lock coupling and replace it with a full cartridge or one previously used by but not emptied. The cartridge contains the fluid mixture and an RFID tag identifying the chemical contents and volume. The installed spray system would have the mating coupling attached to the chemical delivery portion of the system which contains an RFID interrogator or reader connected to a programmable data controller. The controller through the interrogator determines the contents and volume of the connected cartridge, and engages the process equipment of the apparatus to meter the fluid withdrawn according to preprogrammed parameters for distribution or spraying. Thus, with the programmed controller reading the RFID data, minimal or no operator input is required and exposure to the chemical in the cartridge is kept to a minimum by utilizing a snap-and-seal coupling. The traditional fluid delivery system for insect repellent, insecticide or pesticide requires the operator to open, measure, and dilute concentrated chemicals. In contrast, the present invention does not require that the operator open the cartridge nor does the operator have to measure or dilute the contents by hand. The cartridge of the present invention is a self-contained sealed unit with a means of electronically identifying the contents and volume. The system of the present invention provides identification of the cartridge contents, resulting in programmed mixing and delivery. All the operator has to do is change the cartridge. An additional feature is that the apparatus will also write data, such as remaining volume, to the cartridge RFID tag. Therefore the operator may change cartridges based upon environmental conditions without wasting a partial cartridge. The partial cartridge may be refitted at any time and the apparatus will be able to determine the content and volume. The operator does not have to do any programming based upon the chemical content of the cartridge. The system identifies the insecticide, pesticide, or repellent and is preprogrammed to spray volume by any preset schedule. The term pesticide herein is utilized to also include insecticide, insect repellent, and any other insect-effecting agents.

Programmable fluid delivery systems have been in use for many years to provide reliable and repeatable fluid delivery to an area with a minimum of hands-on operator control. A common example is the repetitive task of watering and/or fertilizing a lawn to maintain its health and attractiveness. To maximize the effectiveness and minimize the cost of lawn watering, a known amount of water is sprinkled on the lawn over a defined period of time, such as one inch per hour. Initially, this procedure could have been accomplished by pulling a water filled tank across the lawn with water emanating from an attached sprinkling apparatus, such as a fixed horizontal pipe with spaced holes. The adaptation of a flexible hose and sprinkler head to deliver water over a wide area reduced the time necessary to water the lawn, but required constant operator involvement to monitor the application and move the hose and sprinkler around the lawn. A programmable timer placed between the water supply and the hose meant that the time factor could be preset, but the operator still had to move the sprinkler head around the area from time to time. Further improvements utilized traveling lawn sprinklers, irrigation booms, and then underground tubing systems to deliver water through in-ground pop-up spray heads, with the volume controlled by a programmable timer and the area of application controllable through zone application.

To allow more remote operation, U.S. Pat. No. 5,333,785 (1994) to Dodds et al., disclosed a wireless control system for operating irrigation valves for different water supply zones. Further, irrigation systems have developed even more sophisticated remote control systems. To further define the optimum amount of water for an application, Sieminski in U.S. Pat. No. 6,823,239 (2004) developed a programmable irrigation controller that monitored various factors and responded to commands from direct operator input, or through a remote wireless or Internet carrier. Such remote control and data monitoring significantly improve the ability to deliver highly specific amounts of water and nutrients to optimize growth and return on investment.

With the advent of dry powdered lawn fertilizer, the lawn was fertilized by hand-broadcasting the powder about the lawn area. The various machines were adapted to spread the powder uniformly. With the popularity and fitting of houses with exterior hose bibs, the convenience of using a water hose and sprinkler head for the lawn increased. Thereafter, liquid fertilizer concentrate was made available in a container that could be attached to a water hose and the lawn could be watered and fertilized at the same time. During operation with the water running, the concentrate was removed and mixed with the water for delivery onto the lawn by a venturi effect in the mixing adapter. However, this mixing was imprecise and frequently used up the concentrate at such a rapid rate that the cost of application was too great. Consequently, the utilization of an existing in-ground watering system such as described above to disperse fertilizer at the same time is preferred. The advantages include that the fertilizer can be supplied as a concentrate, mixed to a precalculated solution inline or in a reservoir, and delivered at a preset time within a predetermined area or zone. Insecticide and pesticide application systems adapted similar distribution controls for household and commercial use.

In U.S. Pat. No. 3,889,881 (1975) to Cunningham et al., a novel liquid distribution apparatus and method for intermittent dispersal of atomized solutions such as insecticides was described for use within a defined atmosphere, such as a livestock barn. '881 does not describe or claim use of the apparatus in an open area. The invention utilized (1) a closed conduit loop that may be varied in length and placement according to the area to be fogged, (2) a pump to maintain the conduit under constant positive pressure for intermittent dispersion of atomized insecticide in the area to be controlled, (3) atomizing nozzles that only opened above a certain pressure thereby, allowing the system to be constantly pressurized and deliver an instantaneous atomized spray, (4) a variable timer to allow intermittent fogging to reduce cost by reducing the amount of solution used per unit of time, and (5) a reservoir within which the solution is mixed, stored, and returned from the loop. It is stated that the spray from previous insecticide systems settled quickly, thus requiring constant spraying and use of a large amount of insecticide. The advantage of this invention was the ability to provide an atomized mist in an enclosed space (a 'predetermined area' stated in Claim 1) at intermittent times and as such, the fine mist would remain airborne for an extended period of time. Thus, the longer the insecticide was airborne, the more effective it was in reducing insect populations in a horse or cattle barn. The disadvantages include the need to locate or place a large reservoir container, such as a 55 gallon drum, requiring insecticide solution to be periodically mixed from concentrate by the operator, and thereby repeatedly exposing the operator to the fumes or liquid from concentrated insecticides. Additionally, the large reservoir must be filled by the operator with water, and the invention was not designed and does not claim to work in an unenclosed area, such as on the outside perimeter of a livestock barn. Similarly, U.S. Pat. No. 6,047,495 (2000) to Matsumura et al. and U.S. Pat. No. 6,199,770 (2001) to King disclose pesticide or insecticide spraying from an air compressor pressurized piping system within an enclosed space, like a henhouse, attic, or crawlspace.

U.S. Pat. No. 4,742,641 (1988) to Cretti discloses an insecticide or pesticide delivery system comprising a conduit assembly, pump, and reservoir. The liquid delivery also occurs in an enclosed confined space, such as shown inside a wall, but uses pesticide directly from a commercially available concentrate in a container, eliminating the need for dilution and repetitive mixing by an individual. Although the bottle is substantially empty when replaced, the operator must first disconnect and handle the wet supply tube, open a new bottle, reinsert the supply tube, and then close the connection. These operations may expose the individual to concentrated chemical solutions by contact or spillage. In addition, the operator must identify and purchase the correct pesticide because the system has no safety control regarding identification of the liquid, and thus the system will operate pumping any fluid. U.S. Pat. No. 5,007,197 (1991) to Barbett discloses another confined space pesticide delivery system fitted under a housing slab foundation for control of termites, whereas Scott in U.S. Pat. No. 5,660,330 (1997) describes an automated pesticide application through a soaker hose buried around a house perimeter. Takoaka in U.S. Pat. No. 5,394,642 (1995) described a conduit system for retrofitting an existing structure at the eaves or in-ground to deliver pesticide by drip or sprinkle.

However, systems developed for closed area spraying or application are not necessarily effective in the open air. Weather conditions, ground conditions, vegetation, and geographical location are some additional factors that must be taken into consideration when designing an effective open-air eradication program. Thus, different systems have been developed to address these factors. Initial devices developed for open-air spraying included hand pumped sprayers, and more modern engine powered sprayers mounted on wagons, tractors, trucks, and airplanes. For example, U.S. Pat. No. 3,655,130 (1972) to Patrick discloses the use of a hydraulic pump, powered by a tractor power take-off, to deliver pressurized pesticide to powered blower fans. The premixed, diluted pesticide was provided in a large tank, and all directional, velocity and flow control was the hands-on responsibility of the operator.

Currently, frequent use of open-air spraying includes farms, livestock operations, orchards, and mosquito and pest control programs, spraying oil or water based pesticides. Excessive chemical use and fog drifting into inhabited areas prompted adoption of governmental and industry environmental and safety controls. To minimize these concerns, the spraying apparatus and chemicals used had to be adapted for better and more effective control. Such an operation requires minimizing fog drift due to the proximity of inhabitants, and maximizing chemical effectiveness by spraying the correct direction, concentration, and particle size. In U.S. Pat. No. 4,050,629 (1977) to Query et al, a portable fogging apparatus sampled wind velocity using an anemometer and then adjusted the spraying. However, there were more variables than wind speed to consider and advances in control systems were later adapted to modify these systems. U.S. Pat. Nos. 6,669,105 (2003) and 6,926,211 (2005) to Bryan, disclosed the use of an electronic monitoring system to control the spraying. Data on conditions such as wind speed and direction, humidity levels, ground temperature, vehicle velocity, and spray particle composition and size are input into a control system. The system uses programmable controls to read and respond to these conditions, and spray particle size, in real-time, to vary the spraying parameters and thereby, optimize the effectiveness and cost of the operation. But these systems utilize large holding tanks in which a concentrate is poured and mixed with a diluent, such as oil or water, for spraying.

Addressing the need for static systems to spray at intervals around dwellings, Pearce in U.S. Pat. No. 3,926,369 (1975) developed an apparatus and method of spraying an insecticide fog based upon wind direction and velocity to meter the output. More recent developments in the art include increased programmable control in fixed spraying systems and use of more environmentally sound pesticides to increase safety of occupants and operators of the spraying systems. Further improvements with programmable control of pumps and valves have reduced the need for large barrels of spray solution in favor of withdrawing a metered amount of pesticide concentrate from a container and combining it with water or oil diluent in a small reservoir, or simply in-line mixing, just before dispensing to the spray apparatus.

U.S. Pat No. 6,302,161 (2001) to Heller et al., discloses an apparatus and process for dispensing a concentrated water-dilutable insecticide formulation from a container having an inlet port and an outlet port. The concentrated contents of the container must be kept mixed by a fluid recirculation loop, resulting in the need for the inlet and outlet ports on the container. The concentrate is then withdrawn at a predetermined rate by a pump and injected into a water stream, which then flows to a reservoir tank for distribution or spraying. Such an apparatus must be constructed with the extra equipment to support a recirculation loop, and this recirculation loop must be maintained at an increasing cost. The concentrate container must be constructed with two openings instead of one, increasing the cost of the container and doubling the possible exposure of the operator to the pesticide during removal of an empty container and replacing with a full container. In addition, the operator must correctly identify the product concentrate and program the delivery system accordingly, introducing possible additional operator error. See also, U.S. Pat. App. 2004/0035949 of Elkins and Tucker (abandoned) wherein they attempted to maintain insecticide agitation by a similar recirculation loop.

It is clear from the preceding discussion that the haphazard applications of pesticides in the past have caused safety and health concerns, not just for the operators or technicians, but also for homeowners, nearby inhabitants, and animals. A combination of these concerns, along with the economic cost of pest eradication to homeowners, businesses and government, has prompted continual innovation in delivery systems. With greater ability to control pesticide delivery, and the reduced size of water irrigation systems, pesticide application systems for homes and businesses have been similarly adapted to smaller diameter conduit installations. These installations are generally loops of conduit placed at the building eve, near-ground level or possibly around a pool or along a fence of an inhabited area. The pesticide reservoir and pump delivery system must be connected nearby to a water and electricity supply. Some designs require a large barrel as a reservoir for diluted pesticide. The homeowner or technician buys a concentrate, pours it in the barrel, and adds water to a predetermined level. These barrels are unsightly and are thus relegated to spaces near the air conditioner or the pool mechanicals. Nevertheless, homeowners have these systems installed around patio, lawn, pool, and garden areas. Commercial businesses have these systems installed in and around buildings and outside work areas. Control of spray types, times, and volumes is no longer the function of an individual but rather a programmed control system, the location of spray heads, and the pre-packaged pesticide formulation.

Heretofore, safety concerns have been directed primarily at instituting a high degree of control of the volume, timing and direction of the spray. The chemical composition of the spray has been a secondary consideration. Organic based liquid pesticides, such as DDT, have been replaced by lesser toxic compositions, and even 'environmentally friendly' compositions comprised of 'natural' pesticides such as pyrethrins or bacteria. However, these 'friendly' compositions still must be sold to the household consumer or commercial service in liquid or powdered concentrates to minimize shipping cost and still maintain effectiveness. If not as lethally toxic in these concentrations as their predecessors, the homeowner or technician must still exercise caution from direct contact with these concentrates as they may present a danger to contact or ingestion. Additionally, as noted above most of the spraying apparatus utilizes a large container or drum to hold the diluted pesticide mixture or solution prior to spraying. This configuration requires that the homeowner or technician open a container of concentrate, pour the concentrate in the barrel, and then discard the empty concentrate container. Even those systems that do not require a dilution container, such as '641, and possibly '161, above, still require that an individual correctly identify the pesticide, open the containers of pesticide concentrate and fit them to the apparatus or mix them into a larger container, and then reprogram the spray system.

Thus, there is a need for an insecticide, pesticide, and insect repellent distribution apparatus that minimizes operator contact with the pesticide, when the pesticide is added to the apparatus. There is a further need for the distribution apparatus to have the capability to identify the pesticide in the container. There is a further safety need for the system to prevent the connection of an improper container. There is a further need that once the system recognizes the contents of the container, the system utilizes on-board programming to make any adjustments for optimum flow control, dilutions, and spraying without the need for operator programming. In addition, there is a need for the distribution system to be able to write information to the container, such as the volume of fluid remaining, if the container is removed before it is empty. With the utilization of a 'smart' pesticide container or cartridge, the interaction of the homeowner or the technician with the distribution system may be reduced to replacing bottles of concentrate on a periodic basis.

In the present invention, coupling of the container of pesticide, identification of the container contents, and flow control may be accomplished by utilization of a connector apparatus such as described in U.S. Pat. No. 6,897,374 (2005) to Garber et al., wherein the first coupler portion is fixedly mounted on the distribution apparatus and the second coupler portion is fixedly attached to the pesticide concentrate container or cartridge from the manufacturer. The first coupler contains a wireless transmitter and interrogator, such as an RFID reader, and the second coupler on the container contains a wireless transmitter and 'smart' RFID tag, preprogrammed to identify the contents of the container and capable of receiving data. Once the first and second couplers communicate, the system identifies the contents of the pesticide container and adjusts any flow or spray parameters accordingly without operator input. If the cartridge is removed before it is empty, the system writes relevant data to the 'smart' RFID tag in the second connector, enabling the cartridge to be reconnected as required. In addition, the proprietary configuration of the first coupling will thereby prevent anything but a matching second connector from coupling, increasing safety by removing the possibility of incorrect or dangerous liquids being introduced to the system and sprayed in the inhabited area. Furthermore, even if a non-family second connector were successfully mated, the wireless transmitter, or RFID tag, must be present in the second connector and correctly identify a product programmed into the RFID reader for flow into the system to occur. Finally, the combination of the flow control and coupling configuration dramatically reduce or eliminate the possibility of contact with the pesticide concentrate. As a result, operator and system safety are greatly enhanced. Secondarily, since the pesticide is automatically identified by the distribution system without operator input, the system outputs the correct preprogrammed spray amounts and times, thereby increasing the safety of nearby inhabitants, vulnerable vegetation and animals.

U.S. Pat. No. 6,085,805 (2000) to Bates discloses a fleet fuel dispensing system comprising, for example, a truck with an RFID tag in the windshield, a proximity indicator, an interrogator in the pump housing to identify the truck. The interrogator then tells the controller to allow fuel to flow. However, the configuration of the present invention does not utilize a proximity indicator and the RFID tag and interrogator are designed only to communicate in a preconnected or connected state.

U.S. Patent Application No. 2004/0051368 from Caputo discloses a system and method of programming and controlling pumping of medical fluids utilizing an RFID tag on the fluid container and the RFID interrogator interfaced with a pump. The RFID tag may be programmed to contain patient and medication data that when brought in close proximity to the interrogator controls pump functions. Thus, positive patent identification and fluid infusion rate may be preprogrammed into the RFID tag greatly reducing operator input and error.

Thus, there exists a need for an insect control system that minimizes operator exposure and input, controls pump delivery and flow, and maximizes insecticide, pesticide, or repellent utilization.

SUMMARY OF THE INVENTION

The present invention is directed to an apparatus and method of insect control that departs from the several limitations of the references discussed above. The invention may be used on fixed or mobile insect control spray systems.

In addition, it may be used on insect control systems that utilize reservoirs of any size of dilute insect repellent ready for spraying, or on systems that mix the repellent in-line with the diluent, just prior to spraying. The term insect repellent, or 'repellent', herein is utilized to also include insecticide and pesticide, and any other insect-effecting agents.

Once the insect control system is constructed, an RFID paired apparatus that communicates via wireless transmitter and reader acts to (1) identify the mating container or cartridge, (2) identify the repellent contents and volume, (3) communicate with a reader or controller to allow flow through the connector, and (4) with the repellent identified by the connector apparatus, the controller analyzes any other variables in its program, such as dilution requirements, time and weather conditions, and adjusts system mixing, pressure, and flow variables to optimize spray effectiveness of that repellent.

A preferred embodiment of the present invention comprises a repellent container of concentrate mated with a male flow connector, which also acts as the fluid outlet, or spout, the combination hereinafter called a 'cartridge'. The male connector may incorporate a readable and writable RFID tag, or such tag may be placed in a variety of locations on the outside or inside the cartridge body. The corresponding female connector is mounted on an inlet conduit of the spray control system and may incorporate a reader or interrogator, such as an RFID interrogator. Alternatively, the interrogator may be located in any location within the apparatus as long as the tag and reader are in data communication. The reader or interrogator would be in data communication with the controller apparatus. The inlet conduit is further connected to a metering pump for accurately removing a known volume of repellent concentrate from the cartridge into any mixing chamber for water dilution. Distribution of the mixture is accomplished by conventional means of valves and pumps, directing the mixture to the delivery conduit. The transport pump assembly and a valve and motor controller apparatus are in communication with the RFID reader to manipulate fluid flow according to preset parameters. These parameters may be either preprogrammed into the controller, input by an operator through the control panel, and/or resident in the RFID tag of the cartridge. The signal from the tag that carries the identifying data when it is energized by the controller will be interpreted to either (1) disable the system if the ID is not recognized, (2) enable use of various repellants by transmitting identifying data unique to each type and concentration, and (3) may receive data from the controller such as a cumulative pulse count of each cartridge so that the volume removed from the container may be known by the controller allowing the controller to suspend pump activity when the fluid is exhausted. A further advantage of a known remaining volume written to the RFID tag on the cartridge is that the same cartridge may be reattached at a later time and the system will be able to read the remaining volume data to adjust pump withdrawal.

It is an object of the present invention to provide an insect control system that has the capability to identify the pesticide when a supply is connected.

It is a further object to provide a system that can automatically readjust delivery parameters to different container contents AND other variables, including weather conditions, time of day, time of year, geographical locations, and differing pests.

It is a further object of the present invention to provide a system that recognizes the contents of the container, thus enabling positive identification of chemicals used in the system.

It is a further object of the present invention to provide an insect control system that utilizes on-board programming to make any adjustments for optimum flow control, fluid dilutions, and spraying without the need for operator programming. Thus, the interaction of the homeowner or the technician with the system is reduced to replacing bottles of concentrate on a periodic basis.

It is a further object of the present invention to provide an electronic self-identifying container for use in an insect control system.

It is a further object of the present invention to improve safety by preventing the connection of an improper container and liquid, and thus not spraying it into the environment thereby preventing exposure.

It is a further object of the present invention to ensure a consistent dose of repellent by metering out the proper volume determined from the cartridge RFID tag data for just-in-time mist cycles.

It is a further object of the present invention to provide a self-contained and non-refillable chemical cartridge to reduce or eliminate operator exposure.

It is a further object of the present invention to provide an insect control system that can automatically readjust to different container contents via the RFID tag, i.e., different repellants for different times of year, different weather conditions, or different pests to control.

BRIEF DESCRIPTION OF THE DRAWINGS

FIGS. 2A and 2B are plan views of an embodiment of a fluid cartridge comprising generally a body, coupler, and an RFID tag on the body of the container in accordance with the present invention;

FIGS. 3A and 3B are plan views of an embodiment of a fluid cartridge comprising generally a body, coupler, and an RFID tag located in the coupler portion of the cartridge in accordance with the present invention;

BRIEF DESCRIPTION OF THE INVENTION

Figure 1:
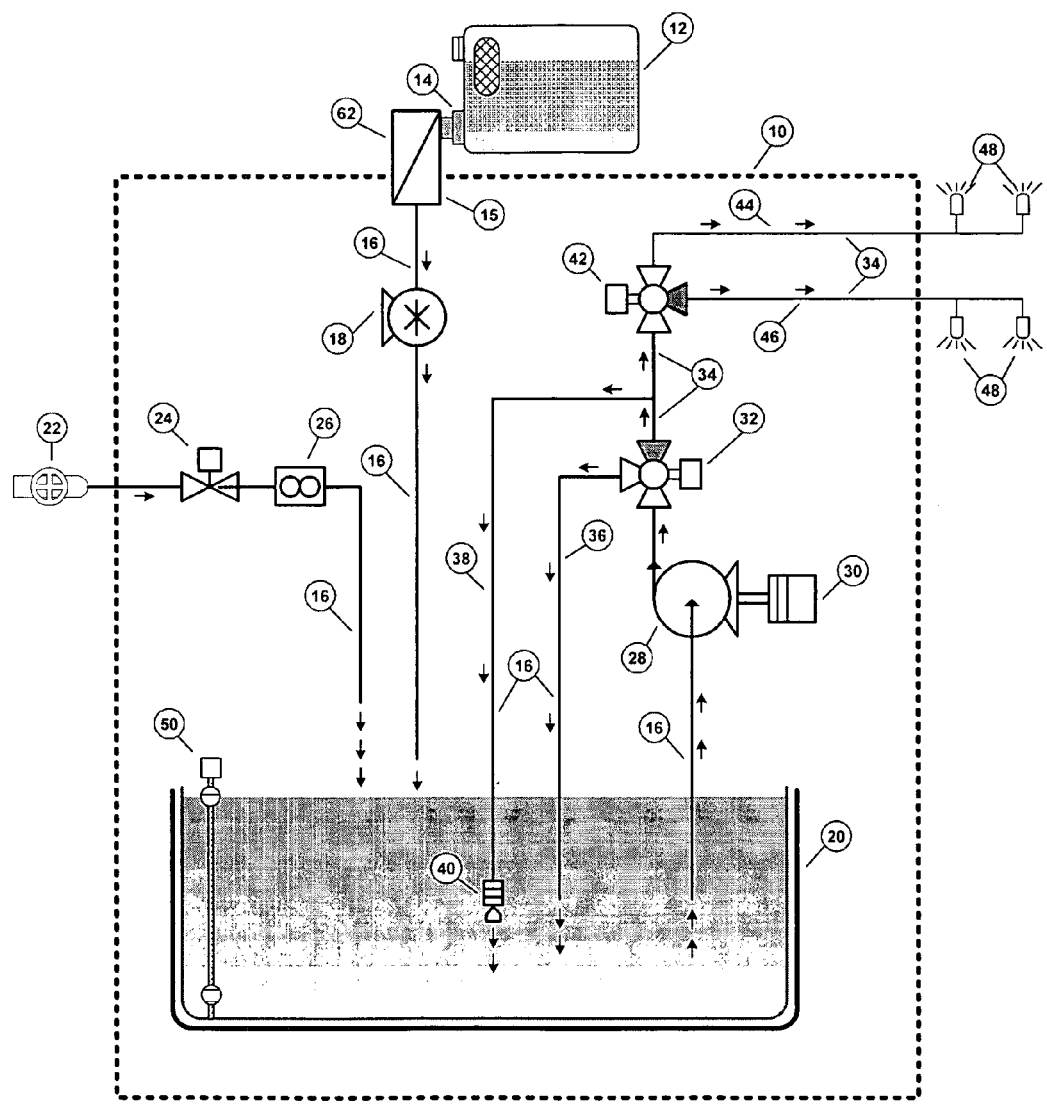
FIG. 1 is a schematic fluid flow diagram of an embodiment of an insect control apparatus in accord with the present invention.

Referring now to the drawings, FIG. 1 shows an embodiment of the process equipment of the insect control apparatus 10 engaged to produce a misting cycle, comprising a mated or coupled fluid-containing cartridge 12, enabling fluid flow through a first coupler portion 14 mated or coupled with a second coupler portion 15 in fluid communication with conduit 16 to metering pump 18 to transfer liquid from the fluid-containing cartridge 12 through further conduit 16 into a mixing vessel 20, with the mixing vessel 20 also receiving flow from diluent supply 22 through supply valve 24 and flow meter 26 and conduit 16. Transport pump 28 is coupled to motor 30 to move liquid via conduit 16 from mixing vessel 20 to mist/agitate valve 32, enabling flow through conduit 16 to nozzle circuit 34 or to agitate flow circuit 36. Return flow circuit 38 enables flow from the nozzle circuit 34 back to the mixing vessel 20 through conduit 16 to provide for rapid depressurization of, and fluid recovery from, the nozzle circuit 34 after transport pump 28 shuts off at the end of a mist cycle. Typically, a pressure-sensitive valve 40 closes on a rise in fluid pressure and closes on a decay of fluid pressure is provided in the return flow circuit 38 to prevent fluid exhaust into the mixing vessel 20 during the mist cycle while still allowing for depressurization of, and fluid recovery from, the nozzle circuit at the end of the mist cycle. One or more zone control valves 42 direct fluid flow in the nozzle circuit 34 through one or more zone conduits 44 and 46 to emerge into the environment through one or more fluid delivery ports 48. The zone control valve 42 effectively multiplies the capacity of a single insect control apparatus 10 in that the entire contents of the mixing vessel 20 can be exhausted through zone conduit 44 in the nozzle circuit 34, a new batch can then be built in the mixing vessel 20, and the contents of the new batch can then be exhausted through a second zone conduit 46. Additional zone control valves 42 can be incorporated into the insect control apparatus 10 to serve additional zone conduits. Conversely, if the nozzle circuit 34 need only consist of a single zone conduit 44, the zone control valve 42 may be eliminated such that a single zone conduit 44 is connected directly to the nozzle circuit 34 port of the mist/agitate valve 42.

The insect control apparatus 10, further comprising one or more float switches 50 in mixing vessel 20 to both close the supply valve 24 when the volume in the vessel 20 reaches a predetermined maximum level during the fill cycle and protect the transport pump 28 from running dry by causing the transport pump 28 to shut off if liquid drops to a certain predetermined minimum level in the mixing vessel 20.

It will be readily apparent by those skilled in the art that additional embodiments comprising variations of process equipment components and conduit communication may be constructed without varying significantly from the precepts of the invention.

FIGS. 2A and 2B show an embodiment of a fluid-containing cartridge 12 in accordance with the present invention, comprising further a body 52 and affixed thereto a first coupler portion 14, an optional hand-hold portion 54 as a convenience, an optional vent or access port 56, allowing external air inflow to replace the consumed fluid volume, and an RFID tag 58. However, the vent may not be necessary if a vent function is incorporated into the first coupler portion 14, or if the cartridge body is substantially flexible to permit collapse as the fluid is removed. From the manufacturer, the first coupler portion 14 may be covered with a cap or other type of protective covering 60 to prevent damage to the first coupler portion 14 or inadvertent fluid loss. In use, the protective covering 60 would be removed to expose the first coupler portion 14 which would then be brought in proximity to the second coupler portion 15 mounted on the insect control apparatus 10. If the data on the RFID tag 58, read by an RFID interrogator 62, is favorably interpreted by the controller 64, the metering pump 18 will be engaged to withdraw fluid from the cartridge 12.

FIGS. 3A and 3B show a further embodiment of a cartridge 12 in accordance with the present invention, comprising further an RFID tag 58 embedded in the first coupler portion 14, or otherwise in close proximity thereto on cartridge 12. It will be recognized by those skilled in the art that various additional embodiments of cartridge 12 may be constructed by varying the shape and dimension of the body 52, varying the location of the first coupler portion 14 on the body 52, whether or not to provide a handhold in the body 52, that a plurality of RFID tags 58 may be employed on cartridge 12, or that the RFID tag(s) 58 may be placed in a plurality of locations on cartridge 12, and still remain within the scope of the invention.

Figure 4:
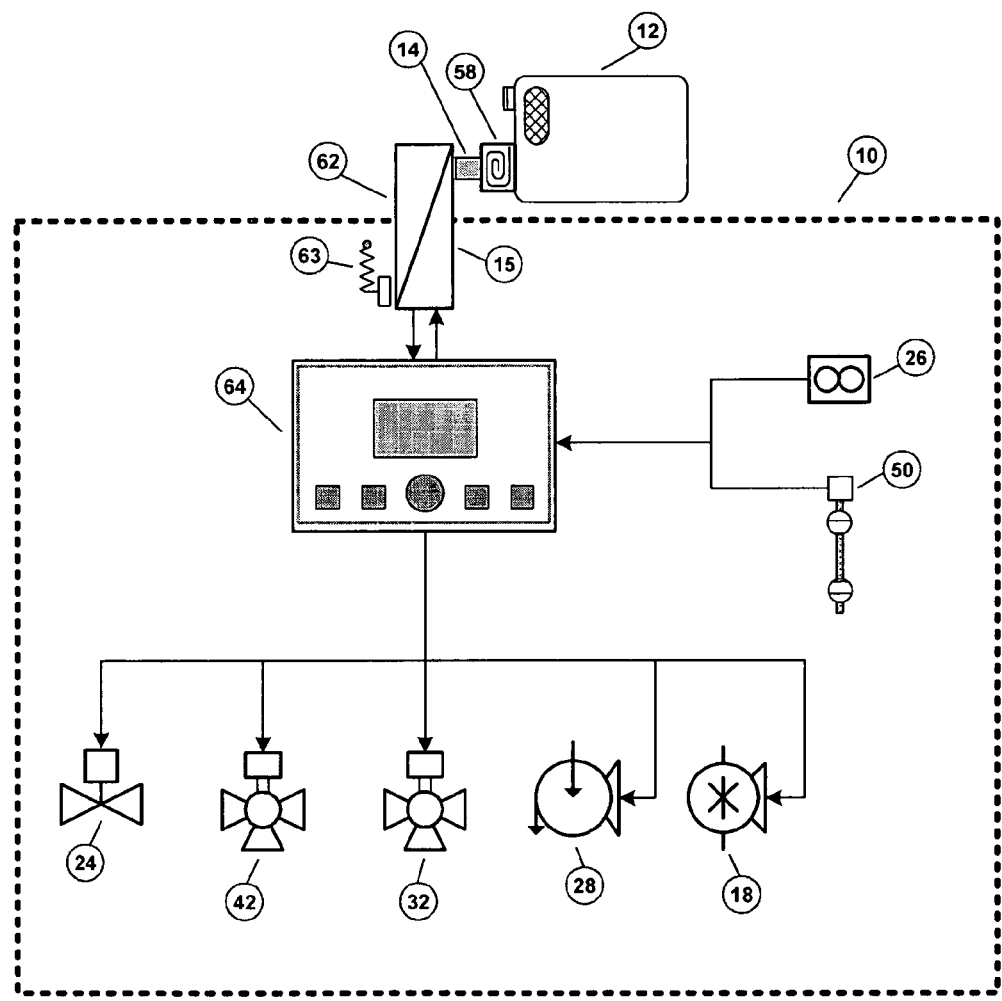
FIG. 4 is an information and control schematic diagram depicting the general electrical design of one embodiment of the present invention, comprising generally the wireless transmitter, interrogator and controller, pumps, switches, and valves in accordance with the present invention.

FIG. 4 shows an embodiment of information and electrical flow depicting the general electrical design of an embodiment in accordance with the present invention of an insect control apparatus 10 comprising generally a cartridge 12 with a first coupler portion 14 and in close proximity thereto an RFID tag 58. An RFID interrogator 62, with a wireless transmitter 63, interfaced to a controller 64 through hard wire connection or transmission, reads and writes data to the RFID tag 58. The controller 64 then queries the RFID tag 58 via transmitted or hard-wired signal from the RFID interrogator 62 to obtain the content specifications of cartridge 12. If the data interpretation is within the parameters programmed into the controller 64, then commands are sent to the process equipment to formulate and distribute the fluid in the mixture vessel 20. Upon favorable interpretation of data from the RFID tag 58, the controller 64 engages metering pump 18 to govern fluid flow from cartridge 12 to the mixing vessel 20, to the supply valve 24, the flow meter 26, the transport pump 28, the mist/agitate valve 32, and the zone control valve 42 to provide a mixture in the mixing vessel 20 for distribution to the agitate flow circuit 36 and/or the nozzle circuit 34. The float switch 50 provides a feedback reading on volume of the mixing vessel 20 to the controller 64 to enable the controller 64 to close the supply valve 24 when the volume fluid in the mixing vessel 20 rises to a predetermined maximum level during the filling of the vessel. The float switch 50 also functions to enable the controller 64 to terminate the misting cycle if the fluid level in the mixing vessel 20 drops to a predetermined minimum level.

In using an RFID tag 58 attached to cartridge 12, the RFID tag 58 is brought in proximity to the RFID interrogator 62. The proximity of the RFID tag 58 and the interrogator 62 may be within a few millimeters if the RFID tag 58 is contained within the first coupler portion 14 and the interrogator 62 is contained within the second coupler portion 15. In an alternative embodiment, an RFID tag 58 may be located on some other area of cartridge 12, such as in FIG. 2B, with the interrogator 62 located in proximity to send and receive data. In this first alternative embodiment the positioning of the cartridge 12 in the insect control apparatus 10 may be designed to place the RFID tag 58 within millimeters of interrogator 62. In a second alternative embodiment, the RFID tag 58 may be placed at a plurality of locations on or in the cartridge 12 and the interrogator 62 may be physically located at a plurality of positions within the insect control apparatus 10 as long as the components remain in data communication.

The RFID tag 58 is provided to transmit identifying data when energized, or 'interrogated', by controller 64 through the RFID interrogator 62. The identifying data is interpreted by programming in the controller 64 to either recognize the ID and enable flow of the liquid from the cartridge 12, or disable flow from cartridge 12, if the ID is not recognized. If the data received does not correspond to controller programming, or no data is received, the system may refuse coupling, not engage the metering pump 18, or shut the process equipment down as precautionary measures. A further advantage of the present invention is that a cartridge 12 may be engaged and disengaged repeatedly until the volume is extracted by the system, due to the presence of the RFID tag 58, that not only transmits identifying data, but receives and writes pumping data to keep track of the volume remaining in the cartridge 12. Since the RFID tag 58 contains data identifying the contents of the cartridge 12, the controller 64 commands the metering pump 18 to provide a certain amount of flow to obtain a target concentration, and that flow may be preset to individual IDs. The RFID tag 58 may contain a number of additional data elements specific to the contents of cartridge 12 in order to govern the mixing and dispersion of the mixture in the mixing vessel 20, including but not limited to time to agitate the solution, maximum spray time during a single mist cycle, and maximum number of mist cycles per day. In addition, by writing data from the controller 64 to the RFID tag 58, the RFID tag 58 may also keep an accurate count of remaining fluid volume in the respective fluid-containing cartridge 12 to alert the system to the remaining volume. Thus, a partially filled cartridge 12 may be removed from the insect control apparatus 10, then reconnected at a later time, and then the apparatus 10 would be able to determine, not only the identity of the contents of the cartridge 12, but also the volume remaining. Thus, fluid-containing cartridges 12 could be easily interchanged depending upon the needs of the consumer and to lessen waste. Such data read-write capability of the insect control apparatus 10 is also convenience feature to allow the consumer to remove and reuse partially filled cartridges 12. In addition, this capability is a safety feature enabling the insect control apparatus 10 to interrupt a misting cycle thereby preventing damage to the process equipment when the controller 64 determines that the cartridge 12 is substantially empty.

In a preferred embodiment of the insect control apparatus 10, the misting cycle starts with the desired concentration of insect repellent and diluent in the mixing vessel 20. A full charge of fluid mixture for distribution consists of 1) dead volume, from the bottom of the vessel to the float switch 50, which protects the transport pump 28 from dry running, 2) line fill, that drains back through the return flow circuit 38 and into the mixing vessel 20 after the previous misting cycle, and 3) the mixture, or active batch, which is a combination of fluid from the cartridge 12 and the diluent supply 22 of water in this embodiment, which will be propelled through the nozzle circuit 34 and atomized through the fluid delivery ports 48 into the environment during the misting cycle.

Upon initiation by an electronic timer (programmable by the user) or signal from a hand-held remote, the controller 64 switches on the transport pump 28. There is a short (generally 30-60 second) agitation cycle where the mix is recycled into the mixing vessel 20 through the normally open agitation port of the mist/agitate valve 32. The zone control valve 42 is then switched to enable the mix transported by the pump 28 to flow through the selected zone conduit 44 or 46 in the nozzle circuit 34. The transport pump 28 remains on for a duration programmable by the user or until the misting cycle is terminated by a signal from the float switch 50. At the completion of the misting cycle, the controller 64 switches off the transport pump 28.

The system is now ready to build a new ‘active batch’ of repellent mixture. The volume in the mixing vessel 20 now consists of a volume equal to the original full charge of the mixture less the volume of the mixture that was pumped from the mixing vessel 20 during the mist cycle, plus line fill volume that has drained back through the return flow circuit 38 following the completion of the mist cycle, plus the pre-existing dead volume in the mixing vessel 20. To initiate the building of a new “active batch” the controller 64 first engages the supply valve 24 allowing water to flow into the mixing vessel 20. The water flows through a flow meter 26 that records the cumulative volume of water that enters the mixing vessel 20. When the volume in the mixing vessel 20 floats the switch 50 to the upper ON position, the controller 64 stops the water flow by actuating the supply valve 24 to the OFF position. The controller 64 then calculates (using the fluid concentration ratio from the RFID tag 58 and the cumulative volume of water that was introduced into the mixing vessel 20 during the fill process as recorded by the flow meter 26) the volume of fluid from the cartridge 12 required to establish the desired concentration in the mixing vessel 20. Using a predetermined flow rate for the metering pump 18, the controller 64 then calculates the run time for the metering pump 18 necessary to dispense the calculated volume of fluid from cartridge 12 into mixing vessel 20. The controller 64 checks the remaining cartridge volume on the RFID tag 58 of the cartridge 12, which was updated by the controller from the previous usage cycle, and then, if sufficient fluid remains in the cartridge to build the correct batch concentration, actuates the metering pump 18 for the required duration which pumps the required volume of fluid from the cartridge 12 into the mixing vessel 20. There is a short agitation cycle, as stated previously, following introduction of the fluid charge from the cartridge 12. The mixing vessel 20 is now recharged and ready to mist again when required by the controller timer or the remote.

The uses of the insect control apparatus 10 of the present invention and proprietary cartridge 12 to automate and control distribution of a mixture utilizing RFID content identification, delivery, and monitoring of data may be adapted to systems other than those devised for insect control. Systems as diverse as liquid fertilizer mixing into irrigation water, manufacturing processes, medical fluids mixing and delivery, and automotive fluid input are but a few.

In a further embodiment, the insect control apparatus 10 may be configured to utilize a plurality of cartridges 12 at the same time. For example, two chemically different fluids could be connected to the insect control apparatus 10 at one time via separate cartridges 12 and coupling mechanism, or a duplicate cartridge 12 of the same chemical or mixture could be attached to reduce or eliminate system downtime when one cartridge 12 becomes empty. As a convenience to the consumer an empty cartridge 12 of the present invention could initiate a visible, audible or electronic signal to promote timely replacement.

The insect control apparatus 10 of the present invention is configured in one embodiment to provide an onboard mixing vessel 20. However, an alternative embodiment of the apparatus would utilize in-line mixing methodologies as known in the art, thus obviating the need for a mixing vessel 20 and potentially reducing cost. In addition, the insect control apparatus 10 may be configured to be adapted to any size mixing vessel 20, such as the ubiquitous 55 gallon drum, or even larger units utilized in fogging and fertilization. As stated above, the volume, mixing and distribution parameters may be programmed into the controller 64. Thus, the presence or size of the mixing vessel 20 is not a limiting factor.

In a further embodiment, the insect control apparatus 10 may be configured to identify and distribute dry or viscous materials in a cartridge 12 or hopper optimized for content delivery to the insect control apparatus 10. Such use of dry material flow control, mixing and distribution in accordance with the present invention, could be adapted to dry fertilizer input for irrigation systems, powdered chlorination systems for swimming pools, water treatment and conditioning systems, as well as other applications.

It is understood that the embodiments and descriptions of the invention herein described are merely instruments of the application of the invention and those skilled in the art should realize that changes may be made without departure from the essential elements and contributions to the art made by the teachings of the invention herein.

What is claimed is:

1. An apparatus for insect control comprising:
   a. a cartridge further comprising a body portion, a first coupler portion, a fluid contained within said body portion and a first wireless transmitter further comprising an electronic identifier and a data accepter;
   b. a second coupler portion disposed to reversibly engage said first coupler portion and in fluid communication therewith,
   c. a second transmitter in data communication with said first wireless transmitter;
   d. an interrogator apparatus in communication with said second transmitter,
   e. a controller in data communication with said first wireless transmitter, said interrogator and said second transmitter,
   f. a metering pump in fluid communication with said second coupler portion and in data communication with said controller,
   g. a diluent input further comprising a supply valve and a flow meter,
   h. a mixing vessel to receive the output from said metering pump and said diluent supply,
   i. Information programmed into said controller to communicate with said transmitters and interrogator to identify said cartridge content and control said metering pump and said diluent supply input to said mixing vessel,
   j. a fluid distribution pump in fluid communication with said mixing vessel,
   k. a plurality of valves and distribution conduits to receive the output from said fluid distribution pump,
   l. a plurality of fluid emission apparatus disposed on said distribution conduits,
   m. information programmed into said controller to communicate with said distribution pump and said valves to distribute said fluid output to said emission apparatus into the environment to effect insect behavior or presence.

2. The apparatus of claim 1 wherein said cartridge body is substantially rigid.

3. The apparatus of claim 1 wherein said cartridge body is substantially flexible.

4. The apparatus of claim 1 wherein said cartridge body further comprises an air vent affixed thereon in communication with the interior volume of said cartridge to allow air input to replace fluid volume removed by said pump.

5. The apparatus of claim 1 wherein said fluid is an insecticide.

6. The apparatus of claim 1 wherein said fluid is a pesticide.

7. The apparatus of claim 1 wherein said fluid is an insect repellent.

8. The apparatus of claim 1 wherein said diluent is water.

9. The apparatus of claim 1 wherein said first coupler portion further comprises a valve disposed therein to affect fluid flow from said cartridge.

10. The apparatus of claim 1 wherein said first wireless transmitter comprises an RFID capable apparatus.

11. The apparatus of claim 1 wherein said first wireless transmitter comprises an RFID capable apparatus further comprising data readable and data writeable portions.

12. The apparatus of claim 1 wherein said electronic identifier comprises a plurality of variable data further comprising cartridge fluid composition, fluid volume, agitation time, spray time information, or mist cycle information.

13. The apparatus of claim 1 wherein said interrogator apparatus is a radio frequency reader/interrogator.

14. The apparatus of claim 1 wherein said first wireless transmitter is affixed to said first coupler portion.

15. The apparatus of claim 1 wherein said first wireless transmitter is affixed to said body of said cartridge.

16. The apparatus of claim 1 wherein said second transmitter is affixed to said second coupler portion.

17. The apparatus of claim 1 wherein said second transmitter is fixedly located within said insect control apparatus in data communication with said first wireless transmitter.

18. The apparatus of claim 1 wherein said programmed controller information comprises a plurality of variable data further comprising chemical identification, fluid volume, chemical concentration, weather conditions, insect-specific data, mixing ratios, agitation information, distribution or misting volumes, timing or rates.

19. The apparatus of claim 1 wherein said apparatus further comprises a valve to direct output from said distribution pump into said mixing vessel to agitate said fluid content.

20. The apparatus of claim 1 wherein said apparatus further comprises a return flow conduit to direct return flow from said distribution conduit to said mixing vessel.

21. The apparatus of claim 1 wherein said mixing vessel is not disposed within said insect control apparatus and remains in fluid communication therewith.

22. The apparatus of claim 1 wherein said mixing vessel is a fifty-five gallon drum.

23. The apparatus of claim 1 wherein said mixing vessel is a bulk container of greater then fifty five gallons.

24. A method of dispersing a mixture in an area comprising:
   a. providing a fluid in a container further comprising a first connector apparatus in fluid communication therewith and a first wireless transmitter further comprising an electronic identifier and data accepter,
   b. connecting said first connector apparatus releasably to a second connector apparatus in fluid communication with a fluid distribution apparatus,
   c. providing a second wireless transmitter and an interrogator attached to said fluid distribution apparatus,
   d. providing a controller apparatus in operational communication with said first wireless transmitter, said second wireless transmitter, aid interrogator and said fluid distribution apparatus,
   e. programming said controller apparatus with information to communicate with said first wireless transmitter, said second wireless transmitter and said fluid distribution apparatus,
   f. said controller apparatus communicating with said first wireless transmitter through said interrogator then through said second wireless transmitter,
   g. transmitting said electronic identifier information from said first wireless transmitter to said controller;

h. interpreting said electronic identifier information by said controller and effecting fluid flow from said container in fluid communication with said fluid distribution apparatus through a plurality of valves, switches, pumps and conduits in operational communication with said controller;

i. mixing said container fluid with a diluent in a mixing vessel of said fluid distribution apparatus, j. dispersing said mixed fluid in said fluid distribution apparatus through said conduit into said area, k. monitoring a plurality of operational variables by said controller in communication with said wireless transmitter and said distribution apparatus, l. recording a plurality of said variables into said wireless transmitter data accepter, m. initiating, adjusting or terminating said fluid flow based upon said information from said wireless transmitter, n. initializing a further cycle of fluid mixing and area dispersion.

25. The method of claim 24 further comprising programming a plurality of variable data into said controller further comprising chemical identification, fluid volume, chemical concentration, weather conditions, insect-specific data, mixing ratios, agitation information, distribution or misting volumes, and timing or rates, and interpreting said variables to effect fluid flow parameters.

26. The method of claim 24 further comprising programming said electronic identifier information comprising variable data of cartridge fluid composition, fluid volume, agitation time, spray time information, or mist cycle information, and interpreting said variables to effect said fluid container operation.

27. The method of claim 24 further comprising interpreting said electronic identifier information by said controller and preventing said fluid flow from said fluid container.

* * * * *